Figure 1:
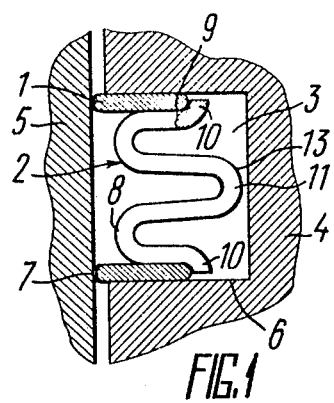

United States Patent [19]

Nemets et al.

[11] 4,408,770
[45] Oct. 11, 1983

[54] PISTON RING ASSEMBLY WITH TANGENTIAL EXPANDER

[76] Inventors: Rusaam S. Nemets, Sirenevy bulvar, 57, kv. 50; Vladimir G. Kislov, Lomonosovsky prospekt, 4, korpus 1, kv. 60; Efim S. Gorbulev, Tovarischesky pereulok, 9/11, kv. 5., all of Moscow; Ivan A. Koval, ulitsa Girshmana, 18, kv. 5., Kharkov; Boris S. Eremenko, Moskovsky prospekt, 96a, kv. 273., Kharkov; Felix A. Brainman, ulitsa Derzhavinskaya, 2, kv. 264., Kharkov; Jury M. Kontsov, ulitsa Krasnova, 14, kv. 29, Odessa; Anatoly V. Adamovich, 2-ya ulitsa Marinoi Roschi, 14a, kv. 35; Lev A. Burov, Kutuzovsky prospekt, 33, kv. 253., both of Moscow; Viktor P. Moldavanov, ulitsa Perekopskoi divizii, 19, kv. 52., Odessa, all of U.S.S.R.

[21] Appl. No.: 368,225

[22] Filed: Apr. 14, 1982

[51] Int. Cl.³ .............................................. F16J 9/06
[52] U.S. Cl. .................................. 277/140; 277/141; 277/142; 277/216; 267/1.5
[58] Field of Search ............... 277/193, 195, 196, 139, 277/140, 199, 216, 138, 141, 142, 148, 154; 267/1.5

[56] References Cited

U.S. PATENT DOCUMENTS

| 2,565,042 | 8/1951 | Phillips | 277/141 |
| 2,587,888 | 3/1952 | Phillips | 277/139 |
| 2,635,022 | 4/1953 | Shirk | 277/140 |
| 3,601,415 | 8/1971 | Bond | 277/140 |
| 4,175,758 | 11/1979 | Adamovich et al. | 277/220 |

FOREIGN PATENT DOCUMENTS

| 2758480 | 7/1979 | Fed. Rep. of Germany | 277/140 |
| 2811830 | 9/1979 | Fed. Rep. of Germany | |

Primary Examiner—Robert S. Ward, Jr.
Attorney, Agent, or Firm—Murray Schaffer

[57] ABSTRACT

A compound oil ring comprises flat rings and a tangential expander provided therebetween. The tangential expander comprises an annular integrally bent serpentine spring having vertically extending webs and horizontally extending flanges terminating in vertically extending bearing shoulders. Each vertically extending flange is bent so as to form at least one bend extending into the interior of the compound oil ring.

3 Claims, 7 Drawing Figures

PISTON RING ASSEMBLY WITH TANGENTIAL EXPANDER

The invention relates to seals, and more specifically to a compound oil ring.

The invention may be most preferably used for sealing pistons and for providing an optimum oil film on walls of cylinders in internal combustion engines, compressors and other piston-type machines.

A compound oil ring according to the invention may also be used for sealing rotary cylindrical parts in various mechanisms.

Known in the art is a compound oil ring comprising two flat rings and a tangential expander provided therebetween.

The tangential expander is a bifunctional expander and it is designed to urge the flat rings in the axial direction against end faces of a piston groove and in the radial direction against the cylinder wall of an engine for sealing the respective surfaces.

The tangential expander comprises an annular spring having vertically extending webs and horizontally extending flanges. Vertically extending bearing shoulders are uniformly distributed over the perimeter at the ends of the majority of the horizontally extending flanges. The bearing shoulders are designed to transmit forces from the tangential expander to the flat rings. The remaining horizontally extending flanges do not have bearing shoulders and their ends protrude beyond the bearing shoulders in the direction toward the axis of the compound oil ring so as to function as centering collars. The centering collar facilitates installation of the compound oil ring in the piston groove and makes it possible to use flat rings of a smaller width in the radial direction independent of the depth of the piston groove. This construction of the tangential expander enables urging the flat rings against the cylinder wall with a lower specific pressure thus improving the wear resistance of the compound oil ring.

Vertically extending webs and horizontally extending flanges are formed by cutting-out notches in a metal tape with subsequent bending of the tape. The cut-out notches are parallel to one another and are made in such a manner that their open ends alternately face opposite edges of the tape. Spring members of the tangential expander are thus formed between the notches (of a compound oil rings AG-5093 made by Goetze AG, Byrscheid, W. Germany).

The spring members of the tangential expander in the prior art oil ring are generally formed by cutting-out the above-described notches. This operation results in disruption of the integrity of fibers (internal structure) of a rolled metal tape thus lowering the durability of resilient properties of the tangential expander under prolonged overloads when the expander is in the compressed state.

At the same time, a part of the horizontally extending webs that do not have bearing shoulders fail to transmit forces from the tangential expander to the flat rings thereby disrupting uniformity of distribution of specific pressures applied by the bearing shoulders to the flat rings.

The values and ratio of the radial and axial forces transmitted by the prior art tangential expander to the flat rings depend to a large extent on the accuracy of its profiled shape and on its developed length, which negatively affects the mobility of the compound oil ring within the piston groove.

Sharp edges formed during cutting-out of notches in the tangential expander of the prior art compound oil ring impair relative mobility of the flat rings and tangential expander at contact points.

Known in the art is a compound oil ring comprising two flat rings and a tangential expander provided therebetween.

The tangential expander is a bifunctional expander since it is designed for urging the flat rings axialy against the end faces of the piston groove, that is along the longitudinal axis of the piston, and radially against the wall of an engine cylinder so as to ensure relative sealing of the pistion and liner.

The tangential expander comprises an annular integrally bent serpentine spring having vertically extending webs and horizontally extending flanges.

The integrally bent serpentine spring is made of a metal tape of rectangular cross-section with rounded edges. The vertically extending webs and the horizontally extending flanges of the tangential expander are formed by bending a metal tape of rectangular cross-section having rounded edges into a serpentine spring which is then shaped so as to form bearing shoulders from the rounded portions of the serpentine spring and vertically extending webs and horizontally extending flanges from the remaining portions of the spring.

This profiling by bending makes it possible to preserve the integrity of fibers (internal structure) of the metal tape obtained by drawing and rolling so that the resistance of the tangential expander to relaxation is improved when the oil ring is under load in an operating engine (cf. U.S. Pat. No. 4,175,758, Cl. F16F 1/34, F 17F 9/36).

The bearing shoulders of the tangential expander provided at the ends of the horizontally extending flanges are designed for the transmission of radial forces from the tangential expander to the flat rings.

The horizontally extending flanges of the tangential expander are designed for ensuring a predetermined position of the flat rings within the piston groove and for the transmission thereto of axial forces from the tangential expander through the vertically extending webs.

The tangential expander and the flat rings are made of metal tapes of rectangular cross-section with rounded edges. Owing to this construction of the tangential expander and flat rings a good mobility of flat rings and tangential expander relative to one another at contact points is ensured. This, in turn, improves the contact of the flat rings with the wall of an engine cylinder upon certain changes in the cylinder shape due to manufacturing errors or during operation of the engine.

The tnagential expander is made in the form of the above-described ring which is cut at one point so as to form end portions. The end portions of the tangential expander form a lock means.

The lock means is formed by the ends of the horizontally extending flanges of the end portions which are bent in such a manner that the ends of one set of horizontally extending flanges are beneath other vertically opposite horizontally extending flanges. The vertically extending webs of the end portions engage one another at the point of cut of the tangential expander so as to limit the radial displacement of the end portions of the tangential expander.

The values and ratio of the radial and axial forces transmitted by the prior art tangential expander to the flat rings largely depend on the accuracy of the profiled shape of the tangential expander, especially when the height of the vertically extending web and the developed length are oversized. This negatively affects the mobility of the oil ring within the groove of a piston.

With some oversizing of the pre-set height of the vertically extending web of the tangential expander, which may occur as a result of inaccurate manufacture of the tangential expander, an axial pressure force develops which is referred to as the critical force and which is transmitted by the tangential expander to the flat rings through the horizontally extending flanges of the expander. This critical pressure force is so great that it disrupts the mobility of the flat rings within the piston groove, the compound oil ring is jammed and fails, that is the ring cannot perform its functions.

Oversized developed length of the tangential expander brings about the similar results.

It will be apparent from the above discussion that the tangential expander should be manufactured with better accuracy so that its manufacture becomes more expensive.

The main object of the invention is to provide a compound oil ring wherein the tangential expander is so constructed as to limit the amount of axial force transmitted by the tangential expander to the flat rings.

Another not least important object of the invention is to provide a compound oil ring wherein the tangential expander is so constructed as to lower requirements imposed upon the accuracy of manufacture of the tangential expander.

A further object of the invention is to provide a compound oil ring wherein the tangential expander is so constructed as to improve its reliability and wear resistance.

These objects are accomplished by that in a compound oil ring comprising flat rings and a tangential expander provided therebetween and comprising an annular integrally bent serpentine spring having vertically extending webs and horizontally extending flanges terminating in vertically extending bearing shoulders, according to the invention, each vertically extending web is bent so as to form at least one bend extending into the interior of the compound oil ring.

With such arrangement of the compound oil ring the bend of the tangential expander formed by a bent portion of the vertically extending web functions as a compensator of an excessive force transmitted by the tangential expander to the flat rings. With an excess of the axial force the bend is subjected to an additional bending deformation so as to retain the mobility of the compound oil ring within the piston groove relative to the engine cylinder wall.

With the provision of the bend in the vertically extending web the axial force at the tangential expander remains unchanged with a certain oversizing of the pre-set height of the vertically extending web. Therefore, the requirements imposed upon the accuracy of manufacture of the tangential expander, hence of the compound oil ring may be lowered.

At least one bend is preferably made in such a manner that its surface facing the axis of the compound oil ring should protrude beyond the bearing shoulders in the direction toward said axis.

With such arrangement of the tangential expander the bend surface facing the axis of the compound oil ring protrudes beyond the bearing shoulders so as to form a centering collar which limits the axial displacement of the compound oil ring within the piston groove independent of the groove depth.

As a result the width (that is the radial size) of the horizontally extending flanges of the tangential expander may be reduced and flat rings with a smaller radial width may be used in the compound oil ring.

This, in turn, makes it possible to lower the specific pressure exerted by the tangential expander upon the flat rings and improve the wear resistance of the compound oil ring.

On the other hand, with such construction of the tangential expander expander its developed length may be increased compared to the prior art tangential expanders without impairing the installation of the compound oil ring on the piston and subsequently in the engine cylinder. It is known that an increase in the developed length of the tangential expander improves the spring characteristics of the compound oil ring.

The compound oil ring is preferably provided with an auxiliary flat ring installed between the flanges of at least one bend.

With such arrangement of the compound oil ring the auxiliary flat ring installed between the flanges of the bend of the tangential expander improves reliability of the seal and prolongs its service life since specific pressure at each flat ring is reduced.

The compound oil ring according to the invention exhibits improved reliability and prolonged service life, improved mobility within the piston groove and mobility of the flat rings and tangential expander relative to one another at points of contact.

The compound oil ring according to the invention is rather simple and inexpensive in manufacture.

Figure 7:
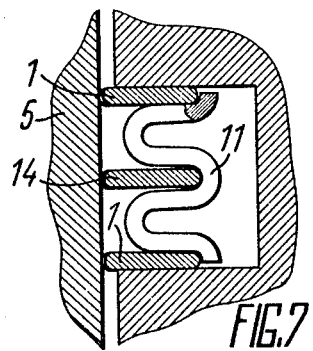
Figure 2:
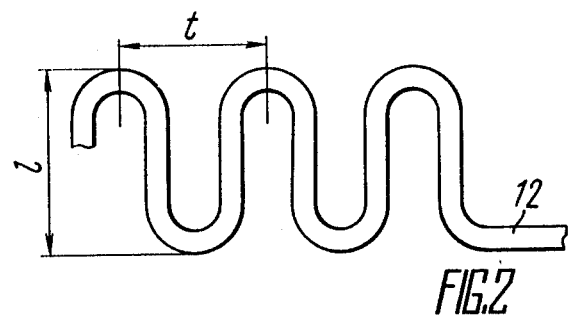
Figure 3:
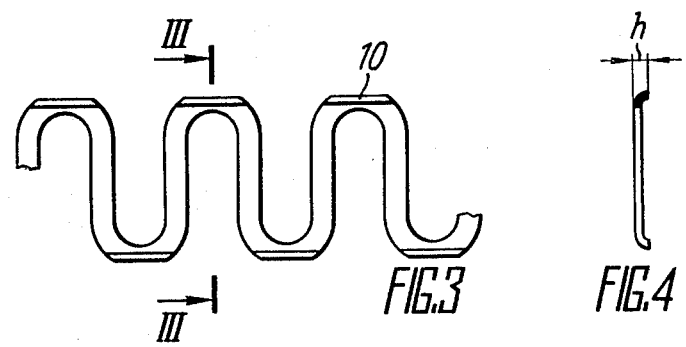
Figure 4:
Figure 5:
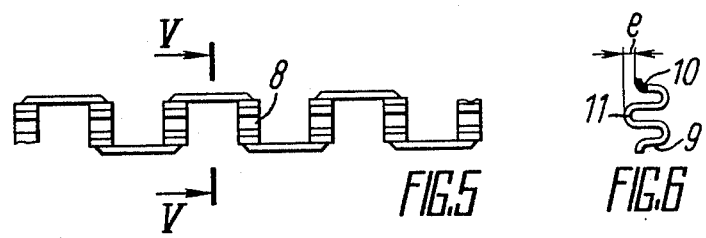
Figure 6:
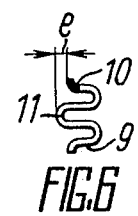

These and other features and advantages of the invention will become apparent from the following detailed description of a specific embodiment thereof with reference to the accompanying drawings, in which:

FIG. 1 schematically shows a sectional view of a compound oil ring according to the invention installed in a piston groove in an engine cylinder;

FIG. 2 schematically shows a diminished view of a part of a serpentine spring which is the blank for a compound oil ring according to the invention;

FIG 3. shows the same part as that shown in FIG. 2, but with bearing shoulders;

FIG. 4 is a sectional view taken along the line III—III in FIG. 3;

FIG. 5 schematically shows a diminished view of a part of a tangential expander in its developed form;

FIG. 6 is a sectional view taken along the line V—V in FIG. 5;

FIG. 7 schematically shows a sectional view of a compound oil ring according to the invention installed in a piston groove in an engine cylinder in case an auxiliary flat ring is provided between flanges of a bend.

A compound oil ring according to the invention comprises two flat rings 1 (FIG. 1) and a tangential expander 2. The compound oil ring is installed in a groove 3 of a piston 4 which is installed in a cylinder 5.

The flat rings 1 are in intimate contact with end walls 6 of the groove 3. Each flat ring 1 is made of a metal tape of rectangular cross-section with rounded edges. Each flat ring engages the inner surface of the cylinder 5 and is provided with an antiscuff coating 7 in the contact zone.

The tangential expander 2 of the compound oil ring is installed between the flat rings 1 and comprises an integrally bent annular serpentine spring which is made of a metal tape of rectangular cross-section with rounded edges.

The tangential expander 2 is a bifunctional expander, that is it is designed for ensuring an intimate contact of the flat rings 1 with the end walls 6 of the groove 3 of the piston 4 and with the inner surface of the cylinder 5.

The tangential expander 2 has vertically extending webs 8 and horizontally extending flanges 9.

The horizontally extending flanges 9 are designed to transmit a force from the tangential expander 2 to the flat rings 1 so as to ensure a secure pressing of the flat rings 1 against the end walls 6 of the groove 3.

Vertically extending bearing shoulders 10 are provided at the ends of the horizontally extending flanges 9.

The bearing shoulders 10 are designed for transmitting the force from the tangential expander 2 to the flat rings 1 so as to ensure an intimate contact between the flat rings 1 and the wall of the cylinder 5.

The vertically extending web 8 of the tangential expander 2 is bent so as to form a bend 11 extending into the interior of the compound oil ring.

In other applications two or several bends may be provided depending on the required rigidity of the tangential expander 2 and height of the groove 3 as measured along the longitudinal axis of the piston 4 which coincides with the longitudinal axis of the compound oil ring (not shown).

The bend 11 is designed to compensate for an excessive axial force at the horizontally extending flanges 9 transmitted by the tangential expander 2 to the flat rings 1.

The vertically extending webs 8 and the horizontally extending flanges 9 define together spring members of the tangential expander 2.

The sequence of making the spring members of the tangential expander 2 is illustrated in FIGS. 2 through 6.

FIG. 2 shows a part of a flat serpentine spring 12 which is the blank of the tangential expander 2.

The serpentine spring 12 is made with a pitch t and a profile height 1. The pitch t and height 1 determine the resilient properties of the tangential expander 2 in radial and axial directions.

FIG. 3 shows the same view as that shown in FIG. 2, but with bearing shoulders 10 provided on the expander.

Each bearing shoulder 10 is of a height h (FIG. 4) which depends on the thickness of the flat ring 1.

FIG. 5 shows a part of the developed view of the tangential expander 2 formed from the serpentine spring 12 shown in FIG. 3 and having horizontally extending flanges 9 with bearing shoulders 10 and verically extending webs 8 bent so as to form the bend 11 as shown in FIG. 6.

All elements of the tangential expander 2 are formed by integrally bending a metal type of rectangular cross-section with rounded edges.

The bend 11 (FIG. 1) is made in such a manner that its surface 13 facing the longitudinal axis of the compound oil ring protrudes beyond the bearing shoulders 10 in the direction toward said axis.

The surface 13 of the bend 11 is designed for centering the compound oil ring in the groove 3 of the piston 4 so that the self-release of the compound oil ring from the groove 3 becomes impossible even with a greater developed length of the tangential expander 2.

In certain applications the compound oil ring may have an auxiliary flat ring 14 (FIG. 7) installed between the flanges of the bend 11.

The auxiliary flat ring 14 extends substantially in parallel with the flat rings 1 and has an antiscuff coating at point of contact with the wall of the cylinder 5 (not shown) similarly to the flat rings 1. The opposite side of the flat ring 14 engages the inner surface of the bend 11.

The auxiliary flat ring 14 is designed to improve sealing of the piston 4 with respect to the cylinder 5.

In addition, the auxiliary flat ring 14 takes up a part of a force transmitted by the tangential expander 2 thereby reducing the specific pressure on each flat ring 1 so as to improve the wear resistance of the compound oil ring.

The flat rings 1 and the tangential expander 2 are split each at one point.

A lock means of a conventional type is provided at the split point of the tangential expander 2.

The lock means is formed by ends of the horizontally extending flanges 9 which are bent in such a manner that when the ring is assembled the ends of one set of horizontally extending flanges 9 extend beneath the opposite horizontally extending flanges 9. The vertically extending webs 8 of the end portions of the tangential expander 2 engage one another so as to limit the radial displacement of the ends of the expander.

The compound oil ring according to the invention functions in the following manner.

In operation piston 4 performs reciprocations. The compound oil ring moves together with the piston so as to distribute an optimum oil filter over the wall of the cylinder 5, the excess of oil being dropped down to the crankcase of the engine along the wall of the cylinder 5 through draining spaces of the tangential expander 2 (not shown) which are defined by the vertically extending webs 9 and through draining ports of the piston 4 (not shown).

The flat rings 1 of the compound oil ring are permanently urged during operation against the wall of the cylinder 5 by the bearing shoulders 10 and against the end faces 6 of the groove 3 of the piston 4 through the horizontally extending flanges 9 by a force from the tangential expander 2.

This force from the tangential expander 2 is provided upon its compression when the tangential expander is installed together with the flat rings 1 in the cylinder 5.

Before installation in the cylinder 5 the compound oil ring comprising the tangential expander 2 and the flat rings 1 is installed in the groove 3 of the piston 4.

During operation of the compound oil ring the flat rings 1 urged against the wall of the cylinder 5 and against the end faces 6 of the groove 3 of the piston 4 continuously oscillate in the radial direction relative to the bearing shoulders 10 and horizontally extending flanges 9 of the tangential expander 2 which engage the flat rings.

The flat rings 1 perform these oscillations while moving along the cylinder 5 which has a certain ovality and taper as a result of manufacture within certain tolerances. Consequently, the flat rings 1 which are in contact with the cylinder 5 are continuously compressed or expanded.

In case any part of the cylinder 5 has an undersizing the flat rings 1 are compressed in the reduced size zone to transmit the force through the bearing shoulders 10 and horizontally extending flanges 9 to the tangential expander 2.

The force of axial pressure urging the flat rings 1 against the end walls 6 of the groove 3 of the piston 4 thus increases.

An excessive force axially urging the flat rings 1 against the end walls 6 of the groove 3 of the piston 4 is taken up by the bend 11. The flanges of the bend 11 are subjected to a bending deformation so that the space therebetween diminishes to compensate for an excessive force of axial pressure urging the flat rings 1 against the end walls 6 of the groove 3 of the piston 4.

In an oversized portion of the cylinder 5, the flanges of the bend 11 are unbent to transmit the pressure force to the flat rings 1 through the horizontally extending flanges 9 and bearing shoulders 10 of the tangential expander 2.

Therefore, the flat rings are permanently urged against the wall of the cylinder 5 and against the end walls 6 of the groove 3 of the piston 4 during operation of the compound oil ring.

An experimental batch of compound oil rings according to the invention made of a metal tape of rectangular cross-section have been subjected to comprehensive tests.

The tests conducted with the experimental compound oil rings made as described above showed high efficiency and the possibility of using one oil ring instead of two on the piston.

Oil burning losses were reduced by 0.2% of fuel consumption.

In accordance with provisional estimates, wear resistance of the compound oil ring was improved by 25%.

The compound oil rings according to the invention are rather simple, they are reliable in operation and have a prolonged service life.

We claim:

1. A piston ring assembly comprising a pair of flat rings and a tangential expander installed between said flat rings adapted to support said rings in contact with the wall of a groove in which said assembly is installed; said tangential expander comprising an annular integrally bent serpentine spring having a plurality of vertically extending webs and alternatively connecting horizontally extending flanges terminating in vertically extending bearing shoulders therebetween, said horizontally extending flanges respectively defining annular surfaces on which said rings are supported in contact with the walls of said groove, and said groove, and said vertical shoulders defining a thrust bearing for said rings; each vertically extending web being bent to form at least one fold extending into the interior of the piston ring assembly with the fold portions defining said bend extending substantially horizontally and the bend being such that the horizontal fold portions remain spaced from each other during use.

2. A piston ring assembly as claimed in claim 1, wherein said at least one fold is made in such a manner that its surface facing the axis of the piston ring assembly protrudes beyond the bearing shoulders in the direction toward said axis.

3. A piston ring assembly as claimed in claim 1, including an auxiliary flat ring installed between the fold portions of said at least one fold.

* * * * *